May 24, 1960 V. E. BECKHAM 2,937,776
TRAILER AXLE WITH PIVOT TILT AND SPRING
Filed Sept. 9, 1958 2 Sheets-Sheet 1
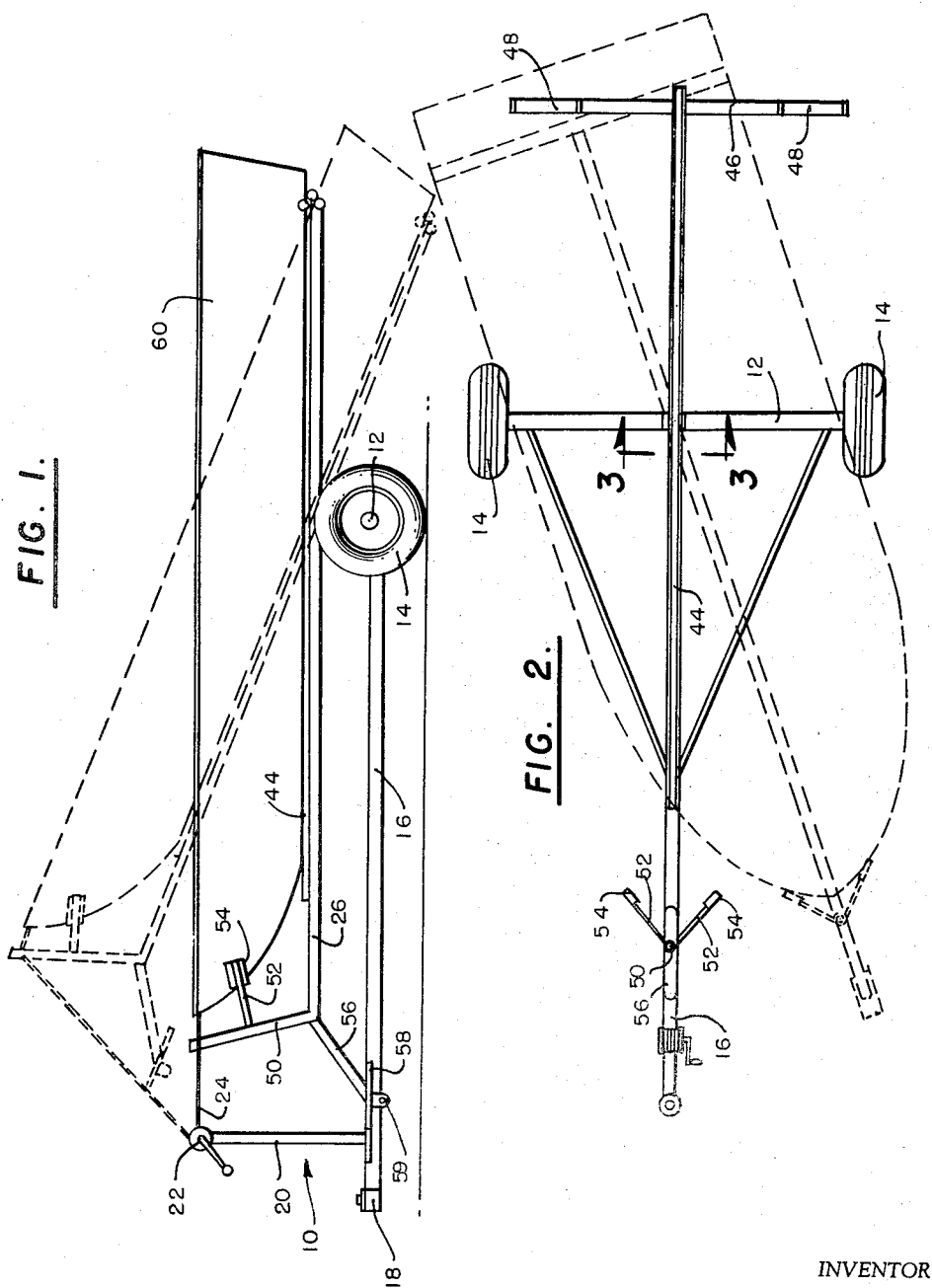
INVENTOR
Virgil E. Beckham May 24, 1960  V. E. BECKHAM  2,937,776
TRAILER AXLE WITH PIVOT TILT AND SPRING
Filed Sept. 9, 1958  2 Sheets-Sheet 2

INVENTOR

Virgil E. Beckham

United States Patent Office 2,937,776
Patented May 24, 1960

2,937,776
TRAILER AXLE WITH PIVOT TILT AND SPRING
Virgil E. Backham, 1612, Crockett Ave., Victoria, Tex.
Filed Sept. 9, 1958, Ser. No. 760,018
1 Claim. (Cl. 214—505)

This invention relates to vehicles and more particularly to trailers.

It is an object of the present invention to provide a trailer unit having a carriage that may be conveniently rotated in all directions to facilitate the loading and unloading thereof.

Another object of the present invention is to provide a trailer having an under frame with a carriage pivotally supported thereon which may be selectively tilted and rotated in any desired direction for the purpose of loading and unloading heavy objects thereon by means of a winch carried by the under frame.

An additional object of the present invention is to provide a trailer of the above type particularly suited for use with boats and the like to enable such to be conveniently loaded and unloaded with a minimum of effort.

Other objects of the invention are to provide a trailer axle with pivot tilt and spring bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

Figure 1 is a side elevational view of a trailer made in accordance with the present invention in operative use;

Figure 2 is a top plan view of the apparatus shown in Figure 1;

Figure 3:
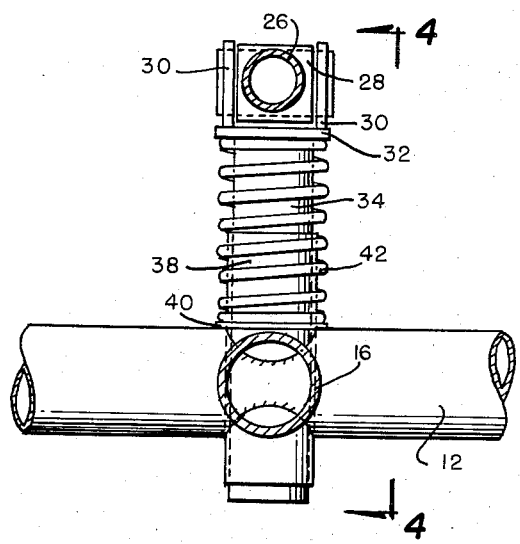
Figure 3 is an enlarged fragmentary transverse cross sectional view taken along line 3—3 of Figure 2.

Referring now more in detail to the drawing, and more particularly to Figures 1 and 2 thereof, a trailer 10 made in accordance with the present invention is shown to include an under frame having a main longitudinal stringer 16 supported at one end upon a transversely extending axle 12 which also rotatably supports a pair of wheels 14, and which has a hitch 18 at the opposite end for connection to a traction vehicle. An upright post 20 adjacent to the hitch end of the under frame supports a winch 22 that provides mechanical advantage for drawing in a cable 24 that may be used to load the boat upon the unit in a manner hereinafter more fully described.

Figure 4:
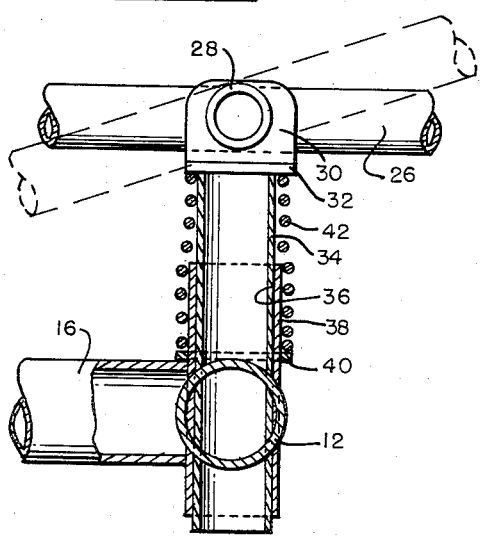
Figure 4 is a cross sectional view taken along line 4—4 of Figure 3.
Figure 5:
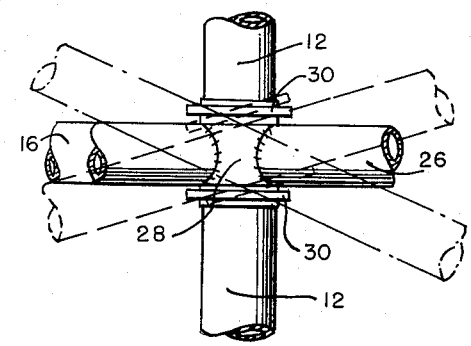
Figure 5 is a plan view of the apparatus shown in Figure 4.

A carriage is pivotally supported upon the under frame for substantially universal movement Figs. 3, 4 and 5. This carriage includes a longitudinal shaft 26 having a bearing portion 28 intermediate its ends. This bearing portion 28 is pivotally supported between a pair of spaced apart parallel plates 30 integral with a circular plate 32 at the upper end of a post 34 that is slidably received within the central longitudinal bore 36 of a sleeve 38 integral with the axle 12. A plate 40 secured to the central portion of the axle 12 forms a lower seat for one end of a compression coil spring 42 that encircles the post 34 and upper end of the sleeve 38 and is seated at its opposite end beneath the plate 32. This spring yieldably resists downward movement of the carriage relative to the under frame so as to provide a spring cushion support for the carriage. A channel member 44, opening upwardly, is secured to the upper surface of the longitudinal shaft 26 so as to form a guide for the keel of a boat 60 that may be slidably drawn therealong and positioned thereupon for transport purposes. The rear extremity of the carriage is provided with a transversely extending cross bar 46 that has a pair of rubber rollers 48 one rotatably supported at each outer end thereof for rollably engaging the bottom of the boat 60 as it is moved on and off of the trailer. The opposite forward end of the shaft 26 is provided with an upwardly and forwardly extending post 50 that has a pair of rearwardly diverging arms 52 provided with padding 54 at their outermost ends for positioning the bow of the boat in the loaded position. A depending strut 56 integral with the post 50 and shaft 26 has a lower mounting plate 58 that is engageable upon the under frame and releasably secured thereto, such as by a retractable lock pin 59.

In actual use, the boat 60 may be unloaded from its transport position shown in Figures 1 and 2 simply by removing the lock pin 59, unwinding the cable 24 by means of the winch 22, and tilting the carriage shaft 26 relative to the under frame to the dotted line position, whereby the boat may be readily withdrawn rearwardly from the trailer. If desired, the carriage may be pivoted as illustrated in Figure 2 by virtue of the pivotal connection between the carriage and the under frame hereinbefore described. To load the boat, the reverse procedure is followed, whereby the carriage may be rotated and tilted into alignment with the path of movement of the boat as it is withdrawn and loaded upon the trailer. It will thus be recognized that this trailer may be used to load or unload the equipment which may be of any particular type, such as boats, farm implements, or the like, from either side or the back of the trailer in a simple and efficient manner.

While various changes may be made in the detail construction, it shall be understood that such changes shall be within the spirit and scope of the present invention as defined by the appended claim.

What I claim as new and desire to protect by Letters Patent of the United States is:

A boat trailer comprising an under frame having a longitudinal stringer, a transversely-extending axle with wheels rotatably supported thereon supporting one end of the stringer, a hitch secured to the opposite end of the stringer for connecting the trailer to a traction vehicle, an upright post fixed to the hitch end of the stringer and a cable winch mounted on the upper end of the upright post and used to load the boat upon the trailer, said axle having a vertical hole therethrough lying at the longitudinal axis of the stringer, a sleeve concentric with the hole, fixed to the axle and extending upwardly therefrom, a post slidably and rotatably adjustable in said sleeve and hole, spaced apart parallel plates secured to the upper end of said slidable post, projections on the sleeve and post and biasing compression coil spring encircling the post and reacting between said projections, a longitudinally-extending carriage shaft overlying the stringer and having a bearing portion intermediate its ends and pivotally connected between the spaced apart parallel plates upon the upper end of said posts for fore and aft tilting movement, an upwardly extending post secured to the forward end of said carriage shaft, rearwardly diverging arms provided with padding secured to the upper extending post, a depending strut extending downwardly from the forward end of said carriage shaft, locking pin means for releasably securing the lower end of said strut to the longitudinally-extending stringer, a channel member opening upwardly and secured to the upper surface of the longitudinally-extending carriage shaft to form a guard for keel of the boat to be slid therealong, said carriage shaft and channel extending rearwardly from there above the wheel axle, and a transversely-extending cross bar secured to the rear end of said carriage shaft and having rollers thereon over which the bottom of the boat is moved when being placed on or off the trailer, said carriage upon being released from the longitudinal shaft whereby said carriage may be tilted aft for receiving or removing the boat and rotated upon its vertical axis to angle the carriage with respect to the longitudinal shaft and wheel axle and while being resiliently supported upon the longitudinal shaft and wheel axle.

References Cited in the file of this patent
UNITED STATES PATENTS

| | | |
|---|---|---|
| 2,221,278 | Utterback | Nov. 12, 1940 |
| 2,500,686 | Jontz | Mar. 14, 1950 |
| 2,765,180 | Albers | Oct. 2, 1956 |
| 2,786,590 | Edwards et al. | Mar. 26, 1957 |
| 2,828,029 | Easley | Mar. 25, 1958 |
| 2,835,401 | Byrd | May 20, 1958 |

UNITED STATES PATENT OFFICE

CERTIFICATE OF CORRECTION

Patent No. 2,937,776                        May 24, 1960

Virgil E. Beckham

It is hereby certified that error appears in the above numbered patent requiring correction and that the said Letters Patent should read as corrected below.

In the grant, lines 1 and 12, and in the heading to the printed specification, line 3, name of inventor, for "Virgil E. Backham", each occurrence, read -- Virgil E. Beckham --.

Signed and sealed this 25th day of October 1960.

(SEAL)
Attest:

KARL H. AXLINE                              ROBERT C. WATSON
Attesting Officer                           Commissioner of Patents